(12) United States Patent
Kotaki

(10) Patent No.: US 8,911,171 B2
(45) Date of Patent: Dec. 16, 2014

(54) ATTACHING DEVICE FOR END OF SPRING

(71) Applicant: TS Tech Co., Ltd., Saitama (JP)

(72) Inventor: Tomonori Kotaki, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 13/874,856

(22) Filed: May 1, 2013

(65) Prior Publication Data

US 2013/0277899 A1  Oct. 24, 2013

Related U.S. Application Data

(63) Continuation of application No. 13/448,750, filed on Apr. 17, 2012, now abandoned, which is a continuation of application No. 12/524,982, filed as application No. PCT/JP2008/051707 on Jan. 29, 2008, now abandoned.

(30) Foreign Application Priority Data

Jan. 29, 2007 (JP) ................................. 2007-017832

(51) Int. Cl.
  *A47C 7/30* (2006.01)
  *B60N 2/72* (2006.01)
  *B60N 2/70* (2006.01)
  *A47C 7/28* (2006.01)
  *F16B 2/22* (2006.01)

(52) U.S. Cl.
  CPC ............... *B60N 2/72* (2013.01); *B60N 2/7041* (2013.01); *B60N 2/7094* (2013.01); *A47C 7/285* (2013.01); *F16B 2/22* (2013.01)
  USPC .......................... 403/397; 24/462; 297/452.52

(58) Field of Classification Search
  CPC ...... F16B 7/0433; A47C 7/025; A47C 7/027; A47C 7/28; A47C 7/285; A47C 7/30; A47C 7/347
  USPC .............. 403/188, 397, 398, 399; 297/452.49, 297/452.52; 24/460, 462
  See application file for complete search history.

(56) References Cited

U.S. PATENT DOCUMENTS 2,249,031 A * 7/1941 Neely ........................... 403/208
3,422,468 A * 1/1969 Schutz ........................... 403/188
(Continued)

FOREIGN PATENT DOCUMENTS

JP 54-32637 U 3/1979
JP 54-34731 Y 10/1979
(Continued)

*Primary Examiner* — Michael P Ferguson
(74) *Attorney, Agent, or Firm* — Drinker Biddle & Reath LLP

(57) ABSTRACT

There is disclosed a device for fixing a U-shaped end of at least one spring for supporting a cushion for a seat, to a seat frame of the seat which includes opposing frame sections, one of the frame sections being formed from a shaft, and the spring being stretched between the frame sections. The device comprises a collar fitted over the shaft and a retainer including a body having a geometry of similar figure with the collar and fitted over the collar on the shaft, and at least one pair of first and second spring engagement pieces provided at both edges of the body. A first axial region and second axial region of the U-shaped end of the spring are engaged with the first piece and the second piece, respectively, whereby the end of the spring is fixed to the shaft through the device.

8 Claims, 5 Drawing Sheets

(56) References Cited

U.S. PATENT DOCUMENTS

| | | | |
|---|---|---|---|
| 3,551,282 A * | 12/1970 | Hogue | 403/188 |
| 4,068,966 A * | 1/1978 | Johnson et al. | 403/397 |
| 4,153,959 A * | 5/1979 | Omley | 24/350 |
| 4,454,636 A * | 6/1984 | Pearson | 24/347 |
| 6,637,824 B1 * | 10/2003 | Yokota | 297/452.52 |
| 7,025,344 B2 * | 4/2006 | Kammel et al. | 403/399 |
| 2007/0258758 A1 * | 11/2007 | Ho | 403/398 |

FOREIGN PATENT DOCUMENTS

| | | | | |
|---|---|---|---|---|
| JP | 02-111346 U | | 9/1990 | |
| JP | 03-103614 A | | 4/1991 | |
| JP | 2006-14867 | * | 1/2006 | A47C 7/02 |

* cited by examiner

ATTACHING DEVICE FOR END OF SPRING

CROSS REFERENCE TO RELATED APPLICATIONS

This application is a continuation of U.S. application Ser. No. 13/448,750, filed on Apr. 17, 2012, which is a continuation of U.S. application Ser. No. 12/524,982, filed on Dec. 18, 2009, now abandoned, which is a PCT National Stage Entry Application of PCT Application no. PCT/JP2008/051707, filed Jan. 29, 2008, which claims the benefit of Japanese Patent Application No. JP 2007-017832, filed Jan. 29, 2007, the entireties of which are incorporated herein by reference.

TECHNICAL FIELD

The present invention relates to an attaching device for fixing end portions of springs to be stretched between opposing frame sections of a seat cushion frame for a seat and, more particularly, to an attaching device for fixing end portions of springs, each of which has a substantially U-shape in outline, to a round shaft which is employed as a frame section constituting one of opposing frame sections of a seat cushion frame for a seat.

BACKGROUND ART

As a vehicle seat, there has been proposed a vehicle seat in which a metal-made round shaft is employed as a rear frame section of a seat cushion frame for the seat, zigzag springs for supporting a cushion thereon are stretched between the round shaft and a forward frame section of the seat cushion frame, and end portions of the zigzag springs are fixed to the round shaft by a retainer (Japanese Patent Application Laid-Open No. 2006-14867).

The retainer comprises a longitudinal body of a substantially U-shape in cross-section, and pairs of first and second spring engagement pieces provided at both longitudinal edges of the longitudinal body so as to be spaced apart from one another along the longitudinal edges, the first spring engagement pieces being bent laterally outwardly from one of the longitudinal edges of the longitudinal body and the second spring engagement pieces being bent laterally outwardly from the other of the longitudinal edges of the longitudinal body. The longitudinal body and the pairs of first and second spring engagement pieces are integrally formed from a metal plate by causing the metal plate to be bent. The retainer is adapted to be mounted on the round shaft with the substantially U-shaped longitudinal body being fitted over the round shaft, with the first spring engagement pieces being located inside the seat cushion frame, and with the second spring engagement pieces being located outside the seat cushion frame. Each of the end portions of the springs is formed substantially in a U-shape in outline and comprises first and second spaced apart axial regions and an intermediate axial region interconnecting the first and second spaced apart axial regions. The end portion of a spring is fixed to the round shaft through the retainer, with the first axial region and the second axial region being heldly engaged with a corresponding first spring engagement piece and a corresponding second spring engagement piece of the retainer, respectively, and with the intermediate axial region being located under the round shaft and engaged with the round shaft.

An inner circumference of the substantially U-shaped longitudinal body of the retainer is dimensioned such that the longitudinal body can be fitted over an outer circumference of the round shaft. Therefore, when the zigzag springs are fixed at the end portions thereof to round shafts having various diameters, for example, about 22.2 mm or 23.8 mm, retainers whose substantially U-shaped longitudinal bodies have inner circumferential sizes that allow the retainers to be fitted over outer circumferences of the round shafts are required to be prepared for the round shafts having various diameters. Moreover, when the retainer which is formed of metal material is directly fitted over the metal-made round shaft, there is a possibility that noise will be produced by rubbing the metal-made retainer with the metal-made round shaft. In order to prevent the production of the noise, application of a resin coating onto the retainer is required, thus resulting in increased cost of the retainer.

SUMMARY OF THR INVENTION

It is therefore an object of the present invention to provide an attaching device for fixing end portions of springs to a round shaft, which can overcome the foregoing problem associated with a diameter of the round shaft to which the attaching device is applied, is inexpensive, and can prevent noise from being generated due to rubbing of the attaching device with the round shaft.

It is another object of the present invention to provide an attaching device for fixing end portions of springs to a round shaft, which can cause the end portions of the springs to be stably fixed to the round shaft and can be applied to the round shaft with simple operation.

In accordance with the present invention, there is provided an attaching device for fixing an end portion of at least one spring for supporting a cushion for a seat, to a seat frame of the seat, wherein the seat frame includes opposing seat frame sections, one of the opposing seat frame sections being formed from a round shaft, the at least one spring being stretched between the opposing seat frame sections, the end portion of the at least one spring being formed substantially in a U-shape in outline and including first and second spaced apart axial regions and an intermediate axial region interconnecting the first and second spaced apart axial regions. The attaching device comprises a resin-made collar of a substantially U-shape in cross-section, and a metal-made retainer including a body having a geometry of similar figure with the collar, and at least one pair of first and second spring engagement pieces provided at both edges of the body, the first spring engagement piece extending downward from one of the both edges of the body and bent laterally outwardly at a lower end thereof for engaging with the first axial region of the at least one spring, the second spring engagement piece extending downward from the other of the both edges of the body and bent laterally outwardly at a lower end thereof for engaging with the second axial region of the at least one spring, the resin-made collar being adapted to be fitted over or mounted on the round shaft with an opening side thereof facing downward, the body of the retainer being adapted to be fitted over or mounted on the collar on the round shaft with the first spring engagement piece being located inside the seat frame and with the second spring engagement piece being located outside the seat frame, the first axial region and the second axial region of the at least one spring being adapted to be engaged with the first spring engagement piece and the second spring engagement piece, respectively, and the intermediate axial region of the at least one spring being adapted to be located under the round shaft, whereby the end portion of the at least one spring is adapted to be fixed to the round shaft.

The attaching device of the present invention which is constructed as discussed above comprises the resin-made collar having a substantially U-shape in cross-section and adapted to be fitted over the round shaft, and the metal-made retainer adapted to be fitted over the resin-made collar on the round shaft, so that even if there is a size difference between an outer circumference of the round shaft and an inner circumference of the resin-made collar, such a size difference can be easily cancelled by elastic deformation of the resin-made collar. More particularly, in a case where the attaching device is applied to a round shaft having a diameter slightly larger than the inner circumference of the collar, fitting of the collar over the round shaft can be easily performed while causing the collar to be deformed in such a manner that an opening of the collar is operatively widened. Even if the attaching device is applied to a round shaft having a diameter smaller than the inner circumference of the collar and a clearance between the round shaft and the collar is produced, production of noise between the attaching device and the round shaft can be effectively prevented by the resin-made collar. Therefore, in order to prevent the production of the noise, application of a resin coating or the like onto the attaching device is not required, thus resulting in reduced cost of the attaching device.

In a preferred embodiment according to the present invention, the first spring engagement piece may be formed so as to have a length which allows the at least one spring to be stretched between the opposing frame sections at a reference height and the second spring engagement piece may be formed so as to have a length relatively shorter than the first spring engagement piece, so that the end portion of the at least one spring is adapted to be fixed to the round shaft with the second axial region thereof being engaged with the second spring engagement piece at a position higher than a position where the first axial region is engaged with the first spring engagement piece, and with the intermediate axial region becoming oblique. In this case, the rear end portion of the spring is interposedly held by the first and second spring engagement pieces with the second axial region thereof in engagement with the second spring engagement piece being situated at a height higher than the first axial region thereof in engagement with the first spring engagement piece, and with the intermediate axial region becoming oblique. Thus, the spring can be stably stretched between the opposing seat frame sections by the attaching device so as to be located at the reference height.

In a preferred embodiment according to the present invention, a plurality of springs may be stretched between the opposing frame sections so as to be spaced apart from one another, and the collar and the body of the retainer may be formed longitudinally, the longitudinal body of the retainer having pairs of first and second spring engagement pieces provided at both edges of the longitudinal body, and the pairs of first and second spring engagement pieces corresponding in number to the springs. In this case, the collar which is adapted to be fitted over the round shaft is formed longitudinally and the retainer which includes the longitudinal body and the pairs of first and second spring engagement pieces provided at the both edges of the longitudinal body, so that end portions of the plurality of springs can be easily fixed to the single round shaft by the attaching device.

In a preferred embodiment according to the present invention, the collar may have at least one elongated-protrusion rising up from a top surface thereof, and the body of the retainer may have at least one through-hole that is formed in a top surface of the body and adapted to be engagedly fitted over the at least one elongated-protrusion when the body of the retainer is mounted on the collar on the round shaft. In this case, the retainer can be prevented from being rotated or circumferentially shifted relative to the collar.

In a preferred embodiment according to the present invention, the collar may have circumferential retaining-flanges provided around both ends thereof. In this case, both ends of the body of the retainer is adapted to be abutted against the circumferential retaining-flanges when the body of the retainer is fitted over the collar on the round shaft, whereby the body of the retainer is positioned relative to the collar by the circumferential retaining-flanges.

DETAILED DESCRIPTION OF THE PREFERRED EMBODIMENT

Figure 1:
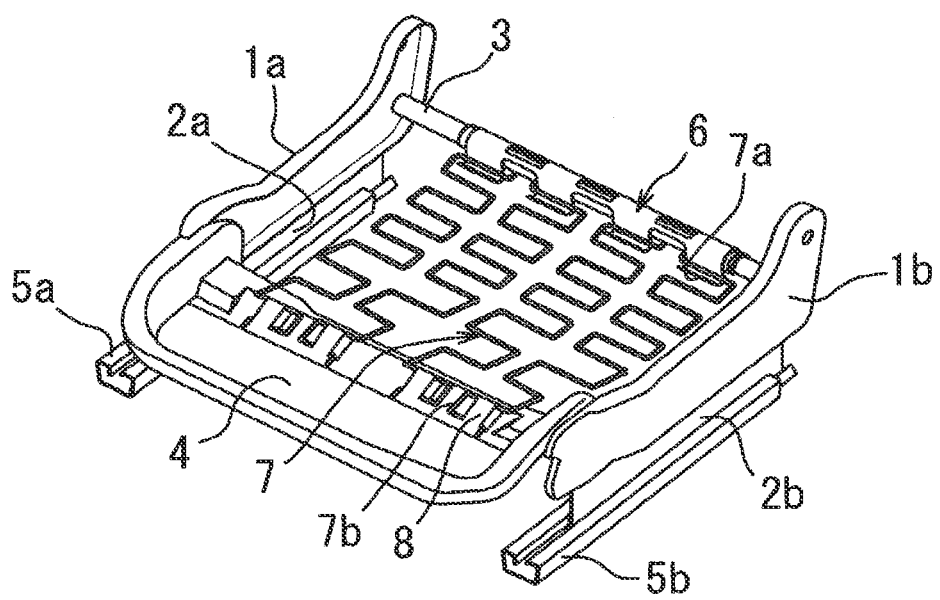
FIG. 1 is a schematic perspective view of a seat cushion frame for a vehicle seat, in which a plurality of springs are stretched relative to the seat cushion frame and end portions of the springs are fixed to a frame section of the seat cushion frame by an attaching device according to the present invention.

Referring to FIG. 1, there is illustrated a seat cushion frame for a slide-type vehicle seat, in which springs are employed as means to support a cushion for a seat cushion of the vehicle seat and fixed at end portions thereof to the seat cushion frame by an attaching device 6 for fixing end portions of springs according to an embodiment of the present invention. The seat cushion frame comprises a pair of spaced apart left and right side frame sections 1a, 1b, a pair of spaced apart upper rail members 2a, 2b integrally attached to the side frame sections 1a, 1b, a round shaft 3 formed from a round pipe or round rod, the round shaft 3 being attached between rear end portions of the side frame sections 1a, 1b, and a pan frame member 4 attached between forward end portions of the side frame sections 1a, 1b. In FIG. 1, reference numerals 5a, 5b denote lower rail members to which the upper rail members 2a, 2b are slidably supported.

In the seat cushion frame, a plurality of springs 7, each of which constitutes a zigzag spring comprising a plurality of substantially U-shaped axial portions continuously connected to one another, are stretched between the round shaft 3 and the pan frame member 4 so as to be arranged in parallel with one another and spaced apart from one another. The springs 7 are horizontally stretched between the round shaft 3 and the pan frame member 4 by causing rear end portions 7a of the springs 7 to be fixed to the round shaft 3 through the attaching device 6 and by causing forward end portions of the springs 7 to be hooked on loop-shaped engaging pieces 8 which are provided at the pan frame member 4 by causing regions of the pan frame member 4 to be cut and then causing the cut regions of the pan frame member 4 to be raised up from a surface of the pan frame member 4.

Figure 2:
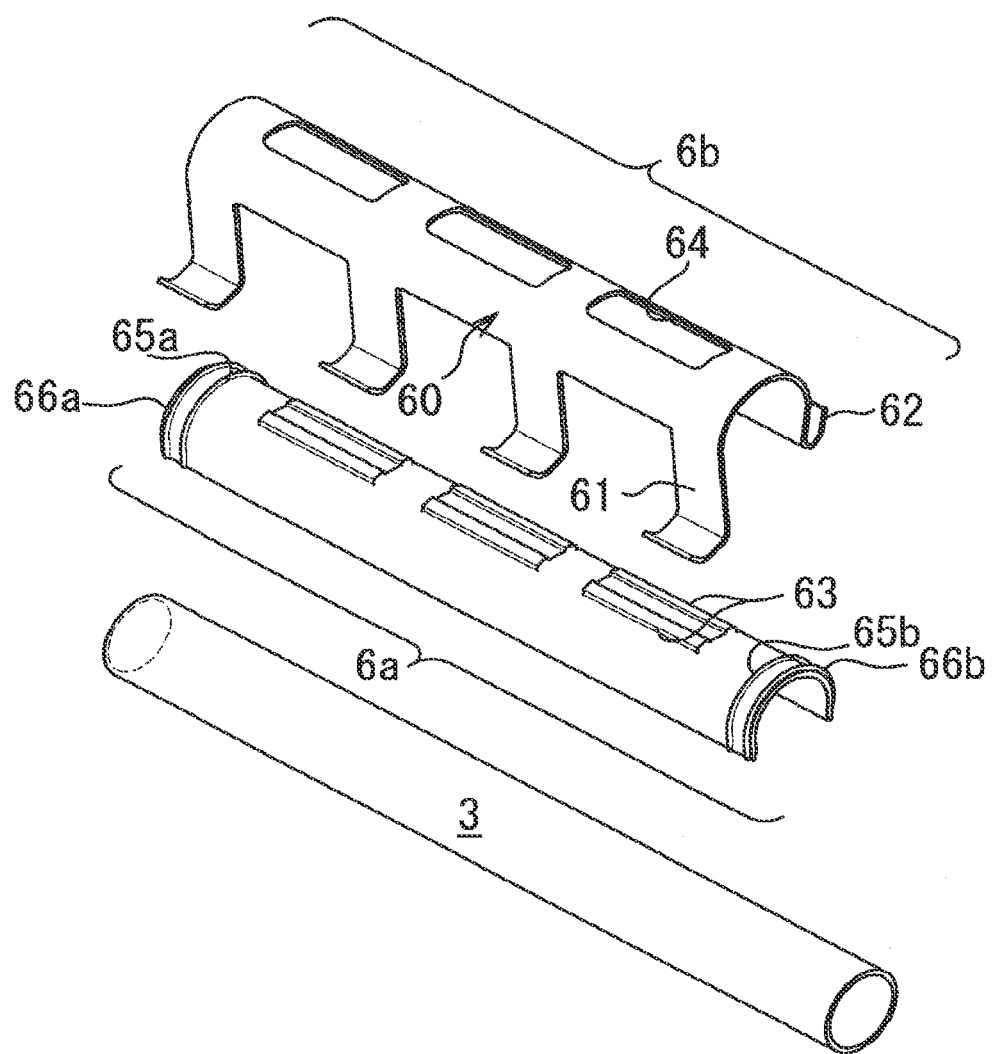
FIG. 2 is a schematic exploded perspective view of the attaching device of FIG. 1 in a state where it is removed from a round shaft.
Figure 3:
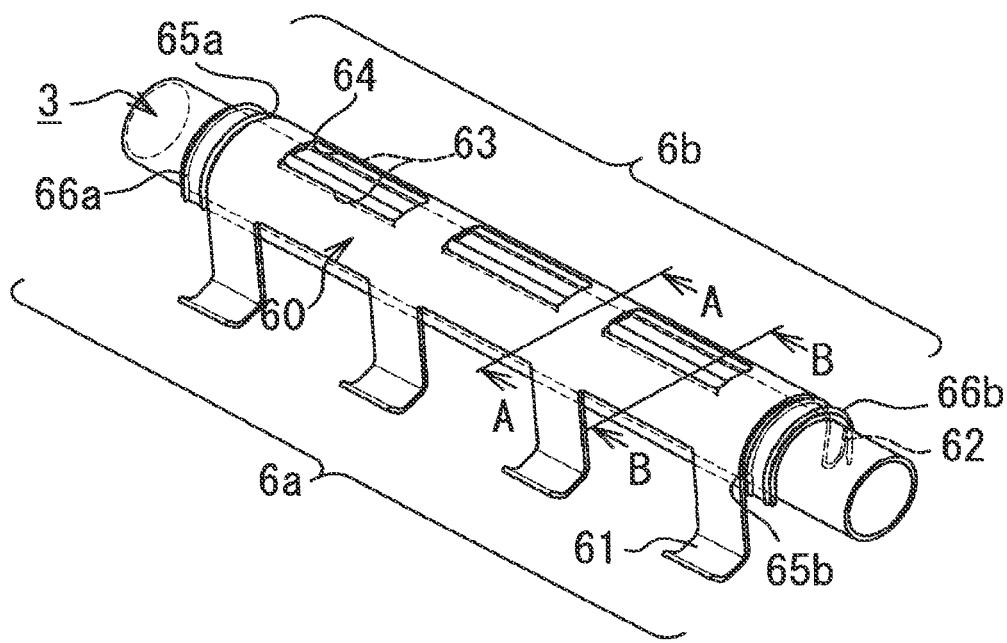
FIG. 3 is a schematic perspective view of the attaching device of FIG. 1 in a state where it is mounted on the round shaft.

In the illustrated example, the attaching device 6 is designed such that it can fix rear end portions of four springs 7 (see FIG. 1) to the single round shaft 3 while allowing the springs 7 to be spaced apart from one another. Referring to FIGS. 2 and 3, the attaching device 6 comprises a resin-made longitudinal collar 6a formed of elastically deformable resin material, for example, polypropylene or the like, and a metal-made retainer 6b formed of, for example, thin steel plate.

The resin-made longitudinal collar 6a is configured so as to have a substantially U-shape in cross-section which allows the longitudinal collar 6a to be mounted on or fitted over the round shaft 3. The longitudinal collar 6a is fitted over the round shaft 3 with an opening side thereof facing downwardly. Moreover, the longitudinal collar 6a is configured so as to have a length which is enough for allowing the rear end portions of the four springs 7 to be fixed to the round shaft 3.

The metal-made retainer 6b comprises a longitudinal body 60 of a substantially U-shape in cross-section and four pairs of spring engagement pieces 61, 62 (only one pair of spring engagement pieces 61, 62 are best shown in FIGS. 2 and 3) provided along both longitudinal edges of the substantially U-shaped longitudinal body 60 so as to be spaced apart from one another in the longitudinal direction of the longitudinal body 60. The longitudinal body 60 of the metal-made retainer 6b is mounted on or fitted over the collar 6a fitted over the round shaft 3, with an opening side thereof facing downwardly. More particularly, the longitudinal body 60 of the retainer 6b is configured so as to have a geometry of similar figure with the collar 6a and an inner circumference size that allows the longitudinal body 60 of the retainer 6b to be fitted over an outer circumference of the longitudinal collar Ga.

The longitudinal collar 6a has three pairs of spaced apart elongated protrusions 63 which rise up from a longitudinal top surface of the longitudinal collar 6a in a state of being fitted over the round shaft 3 and are arranged so as to be spaced apart from one another in the longitudinal direction of the longitudinal collar 6a. Correspondingly, the longitudinal body 60 of the retainer 6b has three through-holes 64 which are formed in a longitudinal top surface of the longitudinal body 60 in a state of being fitted over the collar 6a and in which the protrusions 63 of the retainer 6b are fitted. In order that strength of the retainer 6b can be maintained, the through-holes 64 are formed in the longitudinal top surface of the longitudinal body 60 which are remote from regions of the longitudinal body 60 at which the spring engagement pieces 61, 62 are provided.

The longitudinal collar 6a further has circumferential retaining-flanges 65a, 65b provided around both end portions thereof. When the longitudinal body 60 of the retainer 6b is fitted over the longitudinal collar 6a in the state of being fitted over the round shaft 3, both ends of the longitudinal body 60 of the retainer 6b are abutted against the circumferential retaining-flanges 65a, 65b of the collar 6 whereby the longitudinal body 60 of the retainer 6b are positioned with respect to the collar 6a through the circumferential retaining-flanges 65a, 65b. In order that the both end portions of the collar 6a can be reinforced, the both end portions of the collar 6a has circumferential ribs 66a, 66b provided around edges thereof. In the attaching device according to the present invention, the collar 6a and the retainer 6b are provided as separate components and any resin coating or the like is not required to be applied to the attaching device, thus realizing a decrease in cost.

Figure 4:
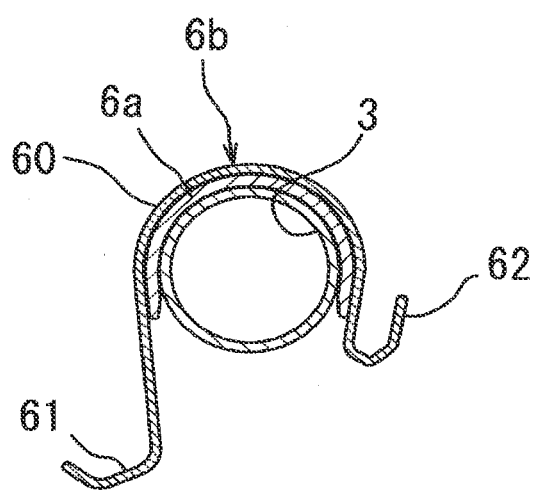
FIG. 4 is a schematic sectional view of the attaching device of FIG. 3, taken along a line A-A in FIG. 3.

As shown in FIGS. 3 and 4, the attaching device 6 constructed as discussed above is applied to the round shaft 3 with the resin-made collar 6a being fitted over the round shaft 3 and with the metal-made retainer 6b being fitted over the collar 6a on the round shaft 3. In the combination comprising the attaching device 6 and the round shaft 3 of the seat cushion frame, the first spring engagement pieces 61 of the retainer 6b fitted over the collar 6a downward extend beyond the round shaft and are located inside the seat cushion frame and the second spring engagement pieces 62 of the retainer 6b downward extend beyond the round shaft 3 and are located outside the seat cushion frame.

More particularly, the first spring engagement pieces 61 and the second spring engagement pieces 62 extend downward from one of the both longitudinal edges of the longitudinal body 60 of the retainer 6b and the other of the both longitudinal edges of the longitudinal body 60, respectively, and are laterally outwardly bent at lower ends thereof in the opposite directions. Each of the first spring engagement pieces 61 is formed in substantially a J-shape and has a length which allows a corresponding spring to be horizontally stretched between the pan frame section 4 and the round shaft 3 at a reference height. Each of the second spring engagement pieces 62 is formed in substantially a U-shape and has a length relatively shorter than that of the first spring engagement piece.

Figure 5:
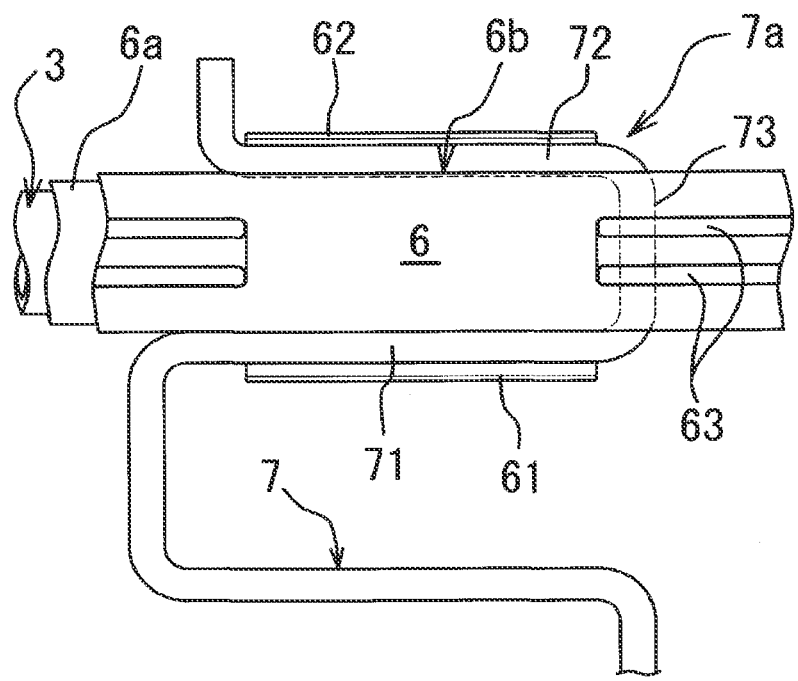
FIG. 5 is a schematic plane view showing a state where an end portion of a spring is fixed to the round shaft by means of the attaching device of FIG. 3.

Referring to FIG. 5, the rear end portion 7a of each of the springs 7 (only one spring 7 is shown in FIG. 5) is formed in substantially a U-shape in outline and comprises a pair of spaced apart axial regions 71, 72 and an intermediate axial region 73 interconnecting the spaced apart axial regions 71, 72. The spring 7 is fixed to the round shaft 3 with the first axial region 71 thereof being engaged with a corresponding first spring engagement piece 61 of the retainer 6b, with the intermediate axial region 73 thereof being located under the round shaft 3, and with the second axial region 72 thereof being engaged with a corresponding second spring engagement piece 62 of the retainer 6b. In this way, the rear end portion 7a of the spring 7 is interposedly held by the first and second spring engagement pieces 61, 62 of the retainer 6b.

Figure 6:
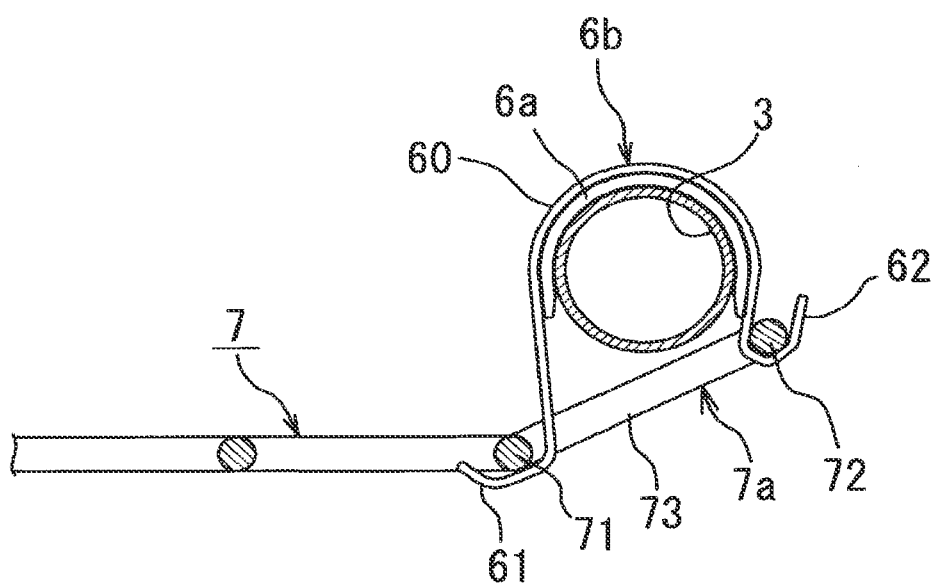
FIG. 6 is a schematic partially sectional side view showing the state where the end portion of the spring is fixed to the round shaft by means of the attaching device of FIG. 3.

Referring to FIG. 6, the rear end portion 7a of the spring 7 is interposedly held by the first and second spring engagement pieces 61, 62 with the second axial region 72 thereof in engagement with the second spring engagement piece 62 being situated at a height higher than the first axial region 71 thereof in engagement with the first spring engagement piece 61, and with the intermediate axial region 73 becoming oblique. Thus, the springs 7 can be stably stretched between the round shaft 3 and the pan frame member 4 by the attaching device 6 so as to become horizontal at the reference height.

When the end portions of the plurality of springs 7 are to be fixed to the round shaft 3 by the attaching device 6 according to the embodiment of the present invention, the longitudinal collar 6a is fitted over the round shaft 3 and the longitudinal body 60 of the retainer 6b having the pairs of spring engagement pieces 61, 62 that correspond in number to the springs 7 is then fitted over the longitudinal collar 6a, so that the attaching device 6 can be easily applied to the round shaft 3 with simple operation.

Figure 7:
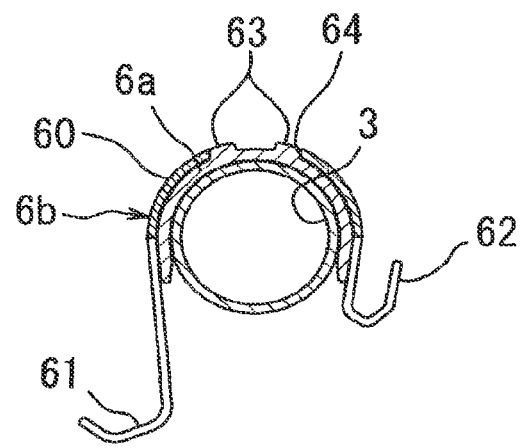
FIG. 7 is a schematic sectional view of the attaching device of FIG. 3, taken along a line B-B in FIG. 3.

Referring to FIG. 7, there is illustrated a condition where the collar 6a is fitted over the round shaft 3 and the longitudinal body 60 of the retainer 6b is fitted over the collar 6a on the round shaft 3. The fitting of the longitudinal body 60 of the retainer 6b over the collar 6a on the round shaft 3 is performed while causing the through-holes 64 of the retainer 6b to be engagedly fitted over the protrusions 63 of the collar 6a. Thus, the longitudinal body 60 of retainer 6b can be prevented from being rotated or circumferentially shifted relative to the collar 6*a* by the engagement of the through-holes 64 with the protrusions 63. Moreover, the both end portions of the longitudinal body 60 of the retainer 6*b* on the collar 6*a* are abutted against the circumferential retaining-flanges 65*a*, 65*b* of the collar 6*a* and positioned by the circumferential retaining-flanges 65*a*, 65*b*. Thus, the fitting of the longitudinal body 60 over the collar 6*b* on the round shaft 3 can be correctly performed.

As discussed above, the resin-made collar 6*a* is fitted over the round shaft 3 and the metal-made retainer 6*b* is then fitted over the resin-made collar 6*a* on the round shaft 3, so that even if there is a size difference between an outer circumference of the round shaft 3 and an inner circumference of the resin-made collar 6*a* having a substantially U-shape in cross-section, such a size difference can be easily cancelled by elastic deformation of the resin-made collar 6*a*. More particularly, in a case where the attaching device 6 is applied to a round shaft having a diameter slightly larger than the inner circumference of the collar 6*a*, fitting of the collar 6*a* over the round shaft 3 can be easily performed while causing the collar 6*a* to be deformed in such a manner that an opening of the collar 6*a* is operatively widened. Even if the attaching device 6 is applied to a round shaft having a diameter smaller than the inner circumference of the collar 6*a* and a clearance between the round shaft and the collar 6*a* is produced, production of noise between the attaching device 6 and the round shaft can be effectively prevented by the resin-made collar 6*a*.

Figure 8:
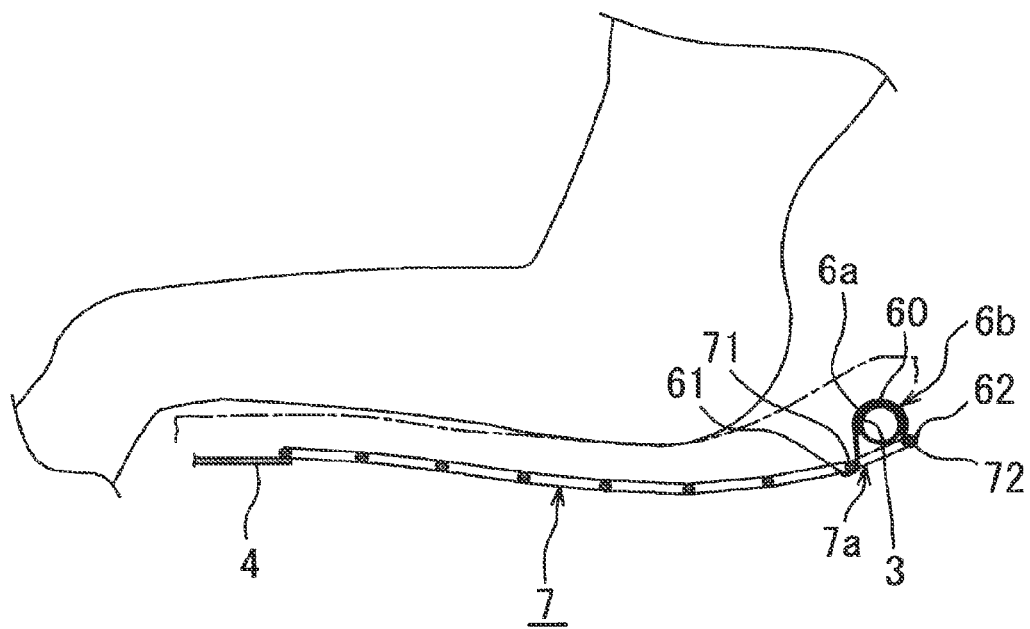
FIG. 8 is a schematic view which is of assistance in explaining the seat cushion frame in a condition where an occupant sits on the vehicle seat.

In the vehicle seat in which the springs 7 are fixed to the round shaft 3 of the seat cushion frame through the attaching device 6 according to the embodiment of the present invention, when an occupant sits on the vehicle seat and the weight load of the occupant is then applied to the seat cushion, the springs 7 are made to downwardly flex as shown in FIG. 8. At this time, even if the attaching device 6 is pulled downward by the downward flexing of the springs 7 and a force which tends to cause the attaching device 6 to be rotated relative to the round shaft 3 is thus applied to the attaching device 6 by the first axial regions 71 of the springs 7 in engagement with the first spring engagement pieces 61 inside the seat cushion frame, an opposing force is produced by the second axial regions 72 of the springs 7 which are engagedly retained by the second spring engagement pieces 62 of the device 6 outside the seat cushion frame.

The opposing force acts as a return torque since the spring engagement pieces 61, 62 of the retainer 6*b* are nipped by the first and second axial regions 71, 72 of the springs 7, so that the collar 6*a* and longitudinal body 60 of the retainer 6*b* are not rotated relative to the round shaft 3 and are maintained in the mounted condition where the opening side of the collar 6*a* and the opening side of the longitudinal body 60 of the retainer 6*b* face downward. Therefore, it is a matter of course that any noise is not generated between the round shaft 3 and the attaching device 6 since the attaching device 6 is not swung or rotated relative to the round shaft 3 when the springs 7 are pulled downward and made to flex. In addition, the retainer 6*b* is not deformed even if it is pulled by the springs 7.

While the case where the round shaft is employed as a member constituting a rear frame section of the seat cushion frame has been discussed above, the present invention may be applied to a seat cushion frame in which a round shaft is employed in lieu of the pan frame member. Moreover, while the case where the rear end portions of the plurality of springs 7 to be stretched between the rear frame section and the forward frame section are fixed to the rear frame section by the single attaching device has been discussed above, the present invention may be applied to a case where the attaching device is designed such that it comprises a plurality of short length collars and a plurality of retainers having short length bodies, which correspond in number to the springs and are constructed substantially in the same manner as the above-mentioned collar and retainer are done. More particularly, each of the collars includes at least one pair of elongated protrusions provided on a top surface thereof and circumferential retaining-flanges provided around both end portions thereof, and each of the retainer bodies includes a pair of first and second spring engagement pieces provided at both edges thereof and at least one through-hole formed in a top surface thereof. In this case, the collars are fitted over the round shaft so as to be spaced apart from one another, the retainer bodies are fitted over the collars with both end portions thereof being abutted against circumferential retaining-flanges of the collars and with through-holes thereof being fitted over elongated protrusions of the collars, and an end portion of each of the springs is fixed to the round shaft via corresponding one of the combinations comprising the collars and the retainers.

The terms and expressions which have been employed are used as terms of description and not of limitation, and there is no intention in the use of such terms and expressions of excluding any equivalents of the features shown and described, or portion thereof, but it is recognized that various modifications are possible within the scope of the invention claimed.

What is claimed is:

1. A spring attachment structure:
  adapted to fix an end portion of at least one spring for supporting a cushion of a seat to a seat frame of said seat, wherein said seat frame includes opposing seat frame sections, one of said opposing seat frame sections being formed from a round shaft,
  wherein:
    said at least one spring is stretched between said opposing seat frame sections;
    said end portion of said at least one spring is formed substantially in a U-shape in outline and comprises first and second spaced apart axial regions and an intermediate axial region interconnecting said first and second spaced apart axial regions;
  wherein said spring attachment structure comprises:
    a resin-made collar of a substantially U-shape in cross-section; and
    a metal-made retainer comprising:
      a body having a geometry of similar figure with said collar and having two edges; and
      at least one pair of first and second spring engagement pieces provided at both edges of said body;
  wherein:
    said first spring engagement piece extends downward from one of the both edges of said body and is bent laterally outwardly at a lower end thereof for engaging with said first axial region of said at least one spring at an engagement portion;
    said second spring engagement piece extends downward from the other of the both edges of said body and is bent laterally outwardly at a lower end thereof for engaging with said second axial region of said at least one spring at an engagement portion;
    said second spring engagement piece engagement portion is positioned higher than said first spring engagement piece engagement portion;
    said resin-made collar is adapted to be fitted over or mounted on said round shaft with an opening side thereof facing downward;

said body of said retainer is adapted to be fitted over or mounted on said collar on said round shaft with said first spring engagement piece being located inside said seat frame and with said second spring engagement piece being located outside said seat frame;

a distance between said second axial region engaged with said second spring engagement piece engagement portion and a lower end of a rear portion of said collar is less than a distance between said first axial region engaged with said first spring engagement piece engagement portion and a lower end of a front portion of said collar;

a circumferential retaining-flange is provided around each of opposite end portions of said collar and has a surface that abuts an end-most edge of the retainer; and a reinforcing rib is formed outside in a longitudinal direction of each of said circumferential retaining-flanges, respectively.

2. The spring attachment structure according to claim 1, wherein:

a hole is formed in said retainer;

a protrusion is provided on a top surface of said collar for being engaged with said hole of said retainer;

a front end and a rear end of said protrusion extend along a front edge and a rear edge of said hole of said retainer, respectively; and a concave portion is formed in a central part of said protrusion.

3. The spring attachment structure according to claim 2, wherein an extending direction of said protrusion of said collar and an extending direction of said circumferential retaining-flange are perpendicular to each other.

4. The spring attachment structure according to claim 2, wherein said protrusion of said collar and said intermediate axial region of said at least one spring are disposed in an overlapped manner in a vertical direction.

5. A spring attachment structure:

adapted to fix an end portion of at least one spring for supporting a cushion of a seat to a seat frame of said seat, wherein said seat frame includes opposing seat frame sections, one of said opposing seat frame sections being formed from a round shaft, wherein:

said at least one spring is stretched between said opposing seat frame sections;

said end portion of said at least one spring is formed substantially in a U-shape in outline and comprises first and second spaced apart axial regions and an intermediate axial region interconnecting said first and second spaced apart axial regions;

wherein said spring attachment structure comprises:

a resin-made collar of a substantially U-shape in cross-section; and a metal-made retainer comprising:

a body having a geometry of similar figure with said collar and having two edges; and at least one pair of first and second spring engagement pieces provided at both edges of said body;

wherein:

said first spring engagement piece extends downward from one of the both edges of said body and is bent laterally outwardly at a lower end thereof for engaging with said first axial region of said at least one spring at an engagement portion;

said second spring engagement piece extends downward from the other of the both edges of said body and is bent laterally outwardly at a lower end thereof for engaging with said second axial region of said at least one spring at an engagement portion;

said second spring engagement piece engagement portion is positioned higher than said first spring engagement piece engagement portion;

said resin-made collar is adapted to be fitted over or mounted on said round shaft with an opening side thereof facing downward;

said body of said retainer is adapted to be fitted over or mounted on said collar on said round shaft with said first spring engagement piece being located inside said seat frame and with said second spring engagement piece being located outside said seat frame;

a distance between said second axial region engaged with said second spring engagement piece engagement portion and a lower end of a rear portion of said collar is less than a distance between said first axial region engaged with said first spring engagement piece engagement portion and a lower end of a front portion of said collar;

a hole is formed in said retainer;

a protrusion is provided on a top surface of said collar for being engaged with said hole of said retainer;

a circumferential retaining-flange is provided around each of opposite end portions of said collar and has a surface that abuts an end-most edge of the retainer; and an extending direction of said protrusion of said collar and an extending direction of said circumferential retaining-flange are perpendicular to each other.

6. The spring attachment structure according to claim 5, wherein:

a front end and a rear end of said protrusion extend along a front edge and a rear edge of said hole of said retainer, respectively; and a concave portion is formed in a central part of said protrusion.

7. The spring attachment structure according to claim 5, wherein:

a reinforcing rib is formed outside in a longitudinal direction of each of said circumferential retaining-flanges, respectively.

8. The spring attachment structure according to claim 5, wherein said protrusion of said collar and said intermediate axial region of said at least one spring are disposed in an overlapped manner in a vertical direction.

* * * * *